UNITED STATES PATENT OFFICE 2,591,229

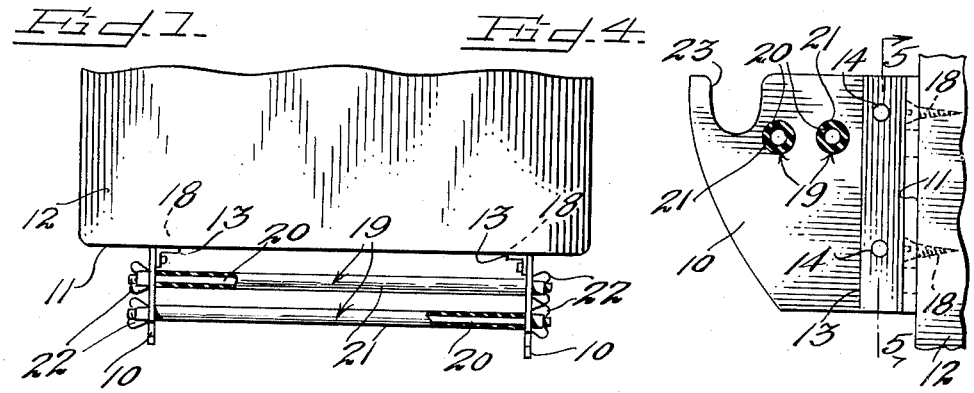
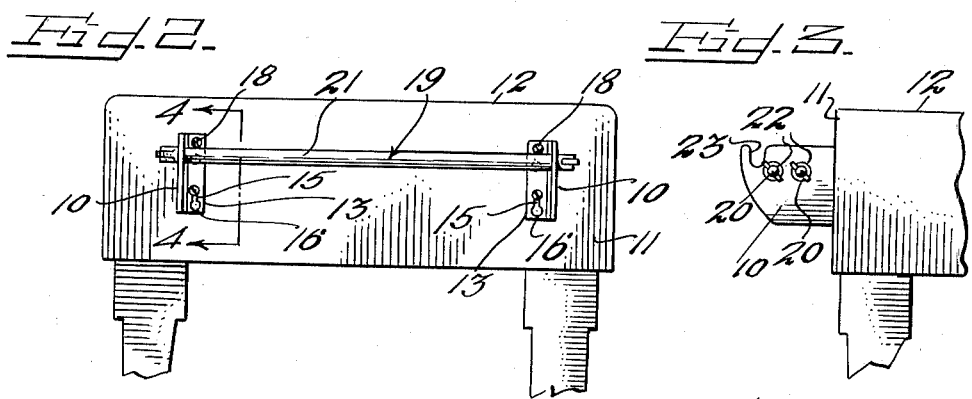
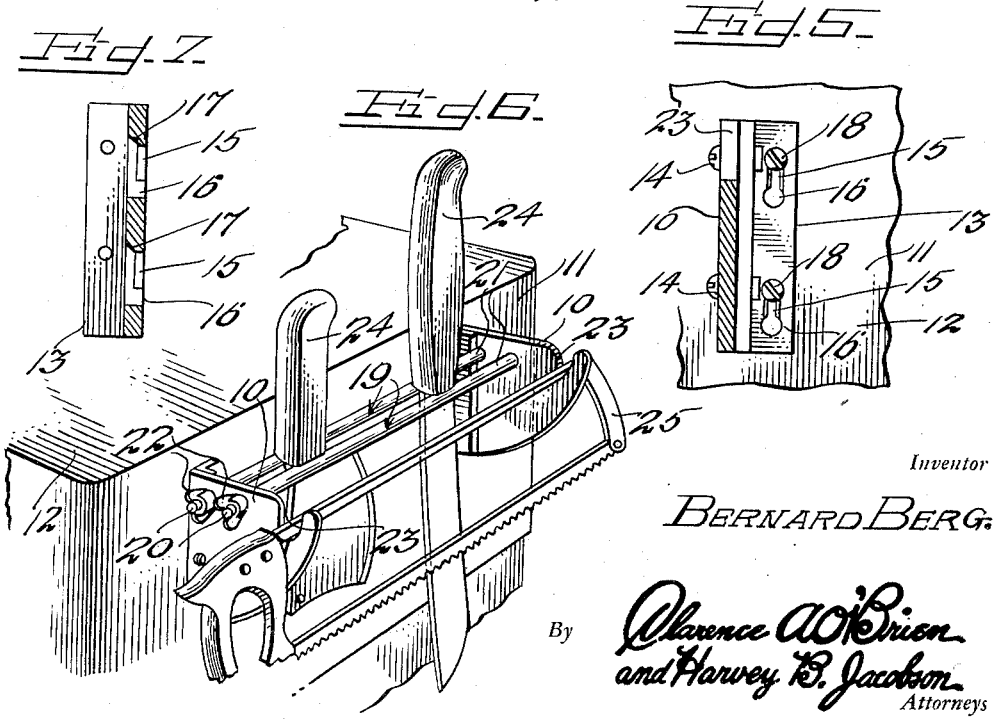

TOOL RACK FOR MEAT BLOCKS

Bernard Berg, Port Edward, British Columbia, Canada

Application May 16, 1946, Serial No. 670,250

4 Claims. (Cl. 211—60)

This invention relates to new and useful improvements and structural refinements in tool racks for meat blocks, and the principal object of the invention is to provide a device of the character herein described, such as may be conveniently employed for the supporting of knives, saws, and other butchers' implements, when the same are not being used.

A further object of the invention is to provide a tool rack which is simple in construction, neat and pleasing in appearance, and which will eliminate the conventional practice of suspending or hanging the tools from overhead hooks, or the like.

Another object of the invention is to provide a tool rack which may be universally applied to various sizes and types of meat blocks.

An additional object of the invention is to provide a tool rack which may be easily applied to or removed from the block and which may be readily disassembled for purposes of cleaning or repair.

A still further object of the invention is to provide a tool rack which will easily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a top plan view of the invention, showing the same attached to a meat block;

Figure 2 is a side elevation of the subject shown in Figure 1;

Figure 3 is an end view of the same;

Figure 4 is a cross sectional view, taken in the plane of the line 4—4 in Figure 2;

Figure 5 is a cross sectional view, taken in the plane of the line 5—5 in Figure 4;

Figure 6 is a perspective view illustrating the invention in use;

Figure 7 is an elevational view, partially broken away, of one of the supporting angles used in the invention.

Like characters of reference are used to designate like parts in the specification and throughout the several views.

Referring now to the accompanying drawings in detail, the invention embodies in its construction a pair of spaced brackets 10 extending laterally from the side 11 of the meat block 12.

An angle 13 is secured by suitable bolts or rivets 14 to the edge of each of the brackets 10 adjacent the meat block, the inturned flanges of the angles 13 being provided with vertically extending slots 15. These slots terminate at their lower ends in enlarged apertures 16, and the outer edges of these blocks may be chamfered as at 17, to receive the flat headed screws 18.

These screws extend into the block 12 for the purpose of securing the angles 13 and the associated brackets 10 in position, and it will be noted that by simply sliding the angles and brackets upwardly, the same may be disengaged from the bolts 18 by virtue of the apertures 16. In this manner, it is not necessary to remove the bolts 18 before the removal of the angles and brackets may be effected.

A plurality of spaced parallel bars 19 extend between the brackets 10, each of the bars consisting of a round rod 20, covered, if desired by a sleeve of rubber, or the like 21.

The end portions of the rods 20 are externally threaded and extend through suitable apertures provided in the brackets 10, a wing nut 22 being positioned on the threaded portion at each end of the rods, as will be clearly apparent from the accompanying drawings.

The upper edges of the brackets 10 are also formed with alined recesses or notches 23, the purpose thereof being hereinafter more fully described. The brackets 10 themselves, assume the configuration substantially as shown in the drawings.

When the invention is placed in use, the knives, or the like, designated collectively by the reference character 24 may be conveniently supported between the bars 19, as is best shown in the accompanying Figure 6. It should be noted in this connection, that the rubber covering 21 will effectively protect the knives from possible damage which could otherwise be sustained by the same contacting the rods 20.

The saw 25, or the like, may be conveniently supported in the notches or recesses 23, and it will be noted that the configuration of the brackets 10 is such as to facilitate the positioning of the saw in the notches, without interference.

The invention may be readily removed from the meat block 12 by simply disengaging the angles 13 from the screws 18, as has been already set forth. Thereupon, the rack may be readily disassembled by simply removing the nuts 22 from the rods 20 and thus separating the rods from the brackets 10.

It is believed that the advantages and use of the invention will be clearly understood from the foregoing disclosure, and accordingly, other description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A tool rack for a butcher's block comprising a pair of vertically disposed end plates, said end plates having straight inner edges and arcuate outer edges, means removably securing said plates to a butcher's block in spaced parallelism relative to each other, a pair of supporting bars connecting said end members, said bars being spaced parallel to form a longitudinal knife seat, opposed arcuate notches provided in the upper portions of said plates forming saw-engaging recesses, and means preventing inward movement of said plates relative to each other, the axes of said bars lying in a horizontal plane.

2. The combination of claim 1 wherein the last mentioned means includes resilient sleeves carried by said bars, the ends of said sleeves bearing against the opposing faces of said end plates.

3. A tool rack for a butcher's block, said rack comprising a pair of end plates, each having first and second spaced openings therein, a first bar having threaded ends received in the first openings in each end plate, a second bar having threaded ends received in the second opening in each end plate, nuts threaded on the ends of each bar, said bars being spaced parallel to each other and the longitudinal axes of said bars lying in a horizontal plane, resilient sleeves embracing said bars and having their ends contacting the end plates, said nuts being tightened to force the end plates against the ends of said sleeves, and a pair of angle iron mounting strips each having a pair of vertically disposed flanges, one flange of each strip being secured against the inner faces of said end plates and the other flanges of said strips having key slots therein adapted to receive attaching screws for securing the rack to a supporting structure.

4. The combination of claim 3, wherein said end plates include upper edges, the upper edge of each end plate having a recess therein for receiving a saw.

BERNARD BERG.

REFERENCES CITED

The following references are of record in the file of this patent:

UNITED STATES PATENTS

| Number | Name | Date |
|---|---|---|
| 862,505 | Perrin | Aug. 6, 1907 |
| 909,255 | Thackston | Jan. 12, 1909 |
| 914,313 | Ryan | Mar. 2, 1909 |
| 935,461 | Cozier | Sept. 28, 1909 |
| 1,231,316 | Watts | June 26, 1917 |
| 1,323,915 | Schmitt | Dec. 2, 1919 |
| 1,579,960 | Sherman | Apr. 6, 1926 |
| 1,667,657 | Dobert | Apr. 24, 1928 |
| 1,706,887 | Knostman | Mar. 26, 1929 |
| 1,733,487 | Hackley | Oct. 29, 1929 |
| 1,748,259 | Van Meter et al. | Feb. 25, 1930 |
| 1,894,258 | Eastlack | Jan. 17, 1933 |
| 1,894,974 | Bleckley | Jan. 24, 1933 |
| 1,916,509 | Hammer | July 4, 1933 |
| 2,030,498 | Chmurski | Feb. 11, 1936 |
| 2,058,416 | Comstock | Oct. 27, 1936 |
| 2,122,069 | Michelson | June 28, 1938 |
| 2,246,652 | Wingard | June 24, 1941 |
| 2,488,664 | Gruber | Nov. 22, 1949 |

FOREIGN PATENTS

| Number | Country | Date |
|---|---|---|
| 236,307 | Great Britain | July 9, 1925 |